(12) United States Patent
Marukawa

(10) Patent No.: US 8,795,862 B2
(45) Date of Patent: Aug. 5, 2014

(54) BATTERY PACK

(75) Inventor: Shuhei Marukawa, Toyohashi (JP)

(73) Assignee: Panasonic EV Energy Co., Ltd., Kosai-Shi, Shizuoka (JP)

( * ) Notice: Subject to any disclaimer, the term of this patent is extended or adjusted under 35 U.S.C. 154(b) by 1390 days.

(21) Appl. No.: 12/196,149

(22) Filed: Aug. 21, 2008

(65) Prior Publication Data

US 2009/0053588 A1  Feb. 26, 2009

(30) Foreign Application Priority Data

Aug. 24, 2007 (JP) ................. 2007-218275

(51) Int. Cl.
*H01M 2/30* (2006.01)
*H01M 2/06* (2006.01)
*H01M 2/34* (2006.01)
*H01M 2/10* (2006.01)

(52) U.S. Cl.
CPC .............. *H01M 2/34* (2013.01); *H01M 2/305* (2013.01); *H01M 2/1072* (2013.01); *Y02E 60/12* (2013.01)
USPC ............. 429/65; 429/121; 429/97; 307/10.7; 307/91; 307/328

(58) Field of Classification Search
CPC ........................... H01M 2/1072; H01M 2/305
USPC .................... 429/65, 96–100, 121; 439/607.01–607.59; 29/623.1–623.5, 29/730–731; 361/823–824; 307/10.7, 91, 307/328; 174/377–387, 51
See application file for complete search history.

(56) References Cited

U.S. PATENT DOCUMENTS

| 5,389,462 A | * | 2/1995 | Lin ............................... 429/121 |
| 5,643,693 A | * | 7/1997 | Hill et al. ....................... 429/121 |
| 6,175,483 B1 | * | 1/2001 | Matsubara .................... 361/119 |
| 6,189,635 B1 | * | 2/2001 | Schuler et al. ............... 180/68.5 |
| 6,464,538 B2 | | 10/2002 | Miyazaki et al. |
| 6,576,838 B2 | * | 6/2003 | Matsumura ..................... 174/66 |
| 7,488,181 B2 | * | 2/2009 | van Haaster ................... 439/66 |

FOREIGN PATENT DOCUMENTS

| JP | 11-238492 | 8/1999 |
| JP | 2001-251089 | 9/2001 |
| JP | 2002-270082 | 9/2002 |
| JP | 2003-115679 | 4/2003 |
| JP | 2005-167052 | 6/2005 |
| JP | 2006-050769 | 2/2006 |

* cited by examiner

*Primary Examiner* — Raymond Alejandro
*Assistant Examiner* — Helen McDermott
(74) *Attorney, Agent, or Firm* — Workman Nydegger

(57) ABSTRACT

A battery pack that electrically connects a terminal cover, which is attached to a terminal base, and a battery pack case even if the terminal cover and case are not in direct contact with each other. The case is formed from a conductive material and accommodates a battery. The terminal base is formed from a non-conductive material and attached to the case. The terminal cover is formed from a conductive material and attached to the terminal base. A conductor formed from a conductive material comes in contact with both of the terminal cover and the case.

6 Claims, 7 Drawing Sheets

BATTERY PACK

CROSS-REFERENCE TO RELATED APPLICATIONS

This application is based upon and claims the benefit of priority from the prior Japanese Patent Application No. 2007-218275, filed on Aug. 24, 2007, the entire contents of which are incorporated herein by reference.

BACKGROUND OF THE INVENTION

The present invention relates to a battery pack, and more particularly, to an improvement in a structure for grounding a terminal cover used as a shield for a battery pack.

Hybrid vehicles and electric vehicles use high voltage battery packs as power sources. Such a battery pack is connected to a high voltage unit of a vehicle by connecting a connector or a round terminal to a terminal base arranged on the battery pack.

A high voltage portion of the battery pack produces electromagnetic noise. Thus, high voltage cables connected to the battery pack are provided with shields. Furthermore, the main body of the battery pack, which accommodates a battery, is covered by a metal case, which is grounded to function as a shield.

The terminal base includes terminal connection portions connected to a connector or round terminal. The terminal connection portions forms a shield interruption in the battery pack. That is, the terminal connection portions form an interruption between the shield of the high voltage cables and the shield of the battery pack main body. By using a connector having an internal structure for connecting the shield of a high voltage cable to the shied of the battery pack main body, the problem of shield interruption at the connection portion can be solved. However, a round terminal has a simple structure and does not include a shield. As a result, electromagnetic noise may leak out of the terminal connection portion.

Accordingly, in the prior art, to prevent the leakage of electromagnetic noise, as shown in FIG. 1, a case 100 for a battery pack main body includes a terminal base 101, which is covered by a metal terminal cover 102. High voltage cables 103 and 104 have distal ends respectively provided with round terminals 105 and 106, which are connected to terminal connection portions 107 and 108 arranged on the terminal base 101. The terminal cover 102 covers the terminal connection portions 107 and 108. FIG. 2 shows the cross-sectional structure of the portion near the terminal base 101. The terminal cover 102 is directly attached to the case 100 of the battery pack main body and grounded via the case 100. Thus, the terminal cover 102 prevents the leakage of electromagnetic noise from the terminal connection portions 107 and 108 of the terminal base 101.

A battery pack may be provided with a high voltage interlock (HVIL) switch, which is arranged on the terminal base. The HVIL switch disconnects the terminal connection portions from the battery when removing the terminal cover. The HVIL switch is one type of a safety device that prevents the application of high voltage to the terminal connection portions of the terminal base that are exposed when the terminal cover is removed. When installing the HVIL switch to the terminal base, stable opening and closing of the switch in accordance with the removal and attachment of the terminal cover must be ensured. Thus, as shown in FIG. 3, a plug 111 is arranged in a terminal cover 112 to open and close the HVIL switch, which is arranged on a terminal base 109. Accordingly, the terminal cover 112 is directly attached to the terminal base 109 on which the HVIL switch 110 is arranged and not to the case 100 of the battery pack main body. In this case, referring to FIG. 4, which shows the cross-sectional structure of the portion near the terminal base 109, the terminal cover 112 does not come into direct contact with the case 100 of the battery pack main body.

Furthermore, to protect the terminal connection portions from moisture, the terminal cover may be provided with a seal. In such a case, to seal the terminal base with the terminal cover, the terminal cover must be directly attached to the terminal base.

In this manner, in a structure in which the terminal cover is attached to the terminal base and not to the case of the battery pack main body, the terminal cover and case cannot be electrically connected, and the terminal cover cannot be grounded. Thus, sufficient shielding of the terminal connection portions cannot be ensured.

Japanese Laid-Open Patent Publication No. 2003-115679 describes a grounding structure for a printed circuit board accommodated in a conductive case. In the publication, a grounding plate, which is arranged on an attachment boss of the printed circuit board, electrically connects the case and printed circuit board. This grounds the printed circuit board. However, such a grounding structure cannot be used as the grounding structure for the above-described battery pack terminal cover.

SUMMARY OF THE INVENTION

The present invention provides a battery pack for electrically connecting a terminal cover, which is attached to a terminal base, and a case for a battery pack even if the terminal cover and case do not directly contact each other.

One aspect of the present invention is a battery pack for accommodating a battery. The battery pack including a case which is formed from a conductive material for accommodating the battery. A terminal base is formed from a non-conductive material and attached to the case. A terminal cover is formed from a conductive material and attached to the terminal base. A conductor is formed from a conductive material and contacts both of the terminal cover and the case.

A further aspect of the present invention is a battery pack for accommodating a battery. The battery pack includes a case which is formed from a conductive material for accommodating the battery. A terminal base is formed from a non-conductive material and attached to the case. A terminal cover is formed from a conductive material and attached to the terminal base. The terminal base includes a first attachment, which is receivable of a first bolt for fastening the terminal base to the case, and a second attachment, which is receivable of a second bolt for fastening the terminal cover to the terminal base. A first bus bar is formed from a conductive material and connects the first and second attachments to connect the terminal cover and the case.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 1 is an exploded schematic perspective view showing the structure near a terminal base in a prior art battery pack;

DETAILED DESCRIPTION OF THE PREFERRED EMBODIMENTS

Figure 1:
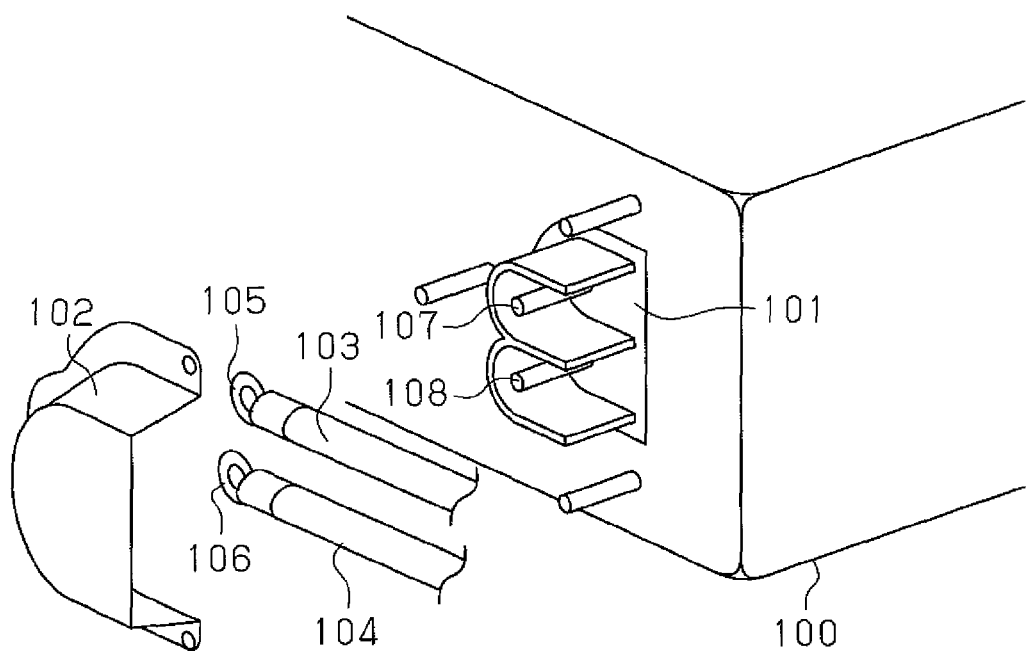
Figure 2:
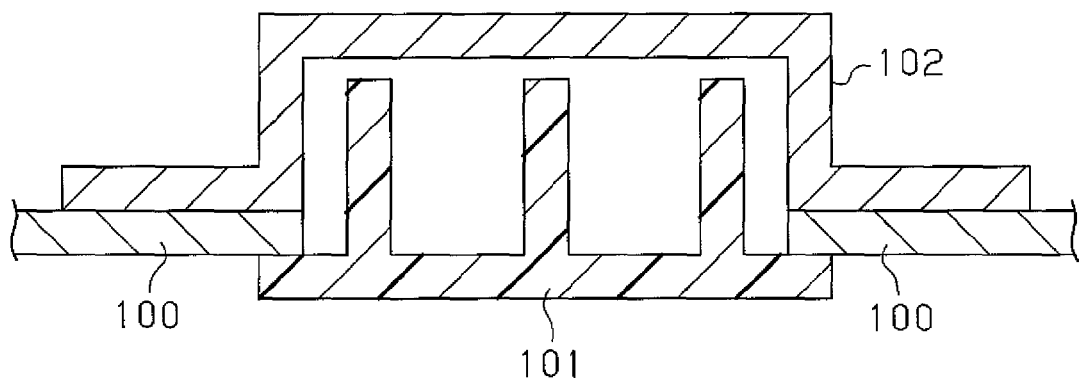
FIG. 2 is a schematic cross-sectional view showing the structure near the terminal base in the battery pack of FIG. 1.
Figure 3:
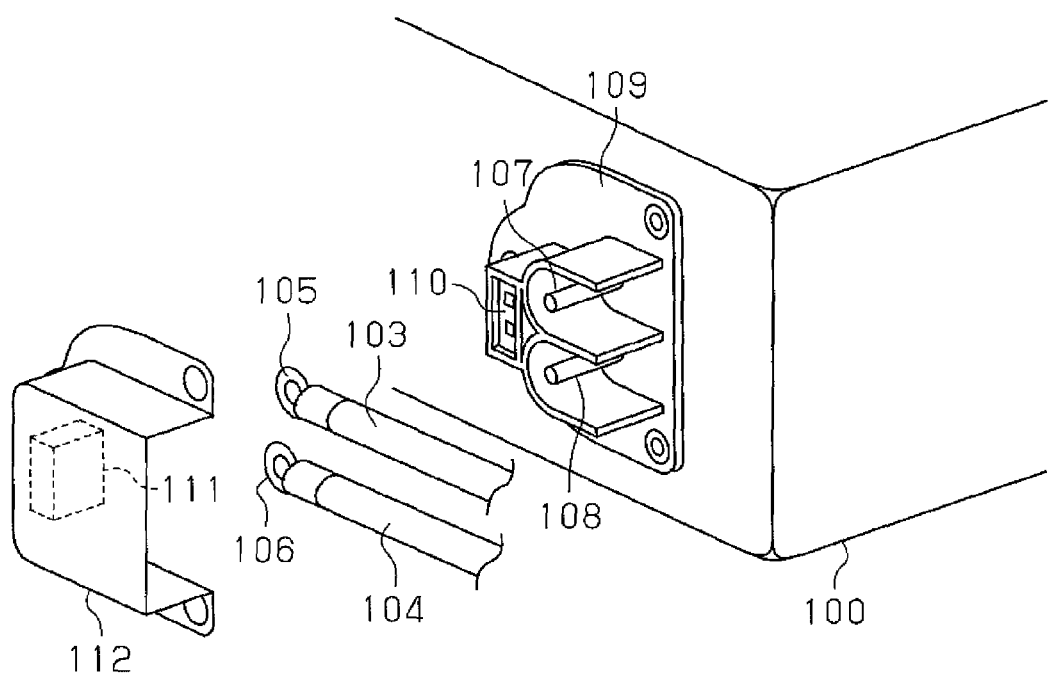
FIG. 3 is an exploded schematic perspective view showing the structure near a terminal base, which includes an HVIL switch, in a prior art battery pack.
Figure 4:
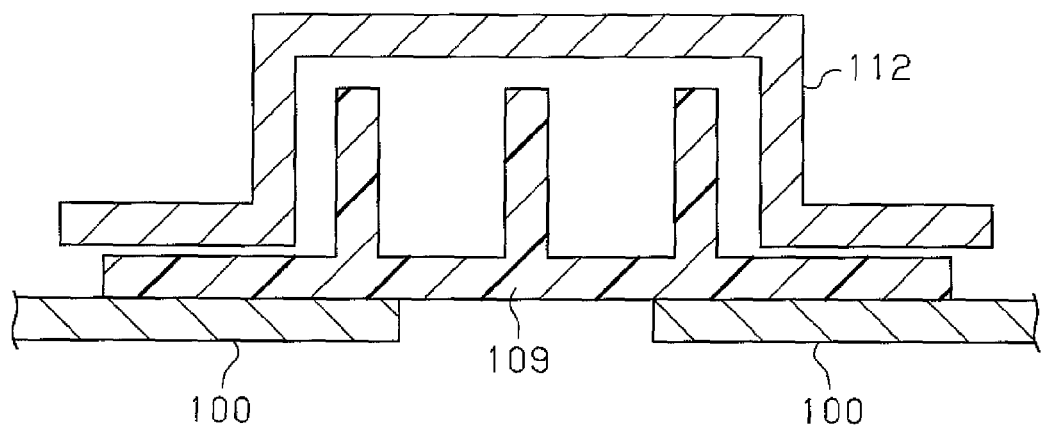
FIG. 4 is a schematic cross-sectional view showing the structure near the terminal base in the battery pack of FIG. 3.

In the drawings, like numerals are used for like elements throughout.

A preferred embodiment of a battery pack according to the present invention will now be discussed with reference to FIGS. 5 to 10. The battery pack is used as a power source for a vehicle such as a hybrid vehicle or an electric vehicle.

Figure 5:
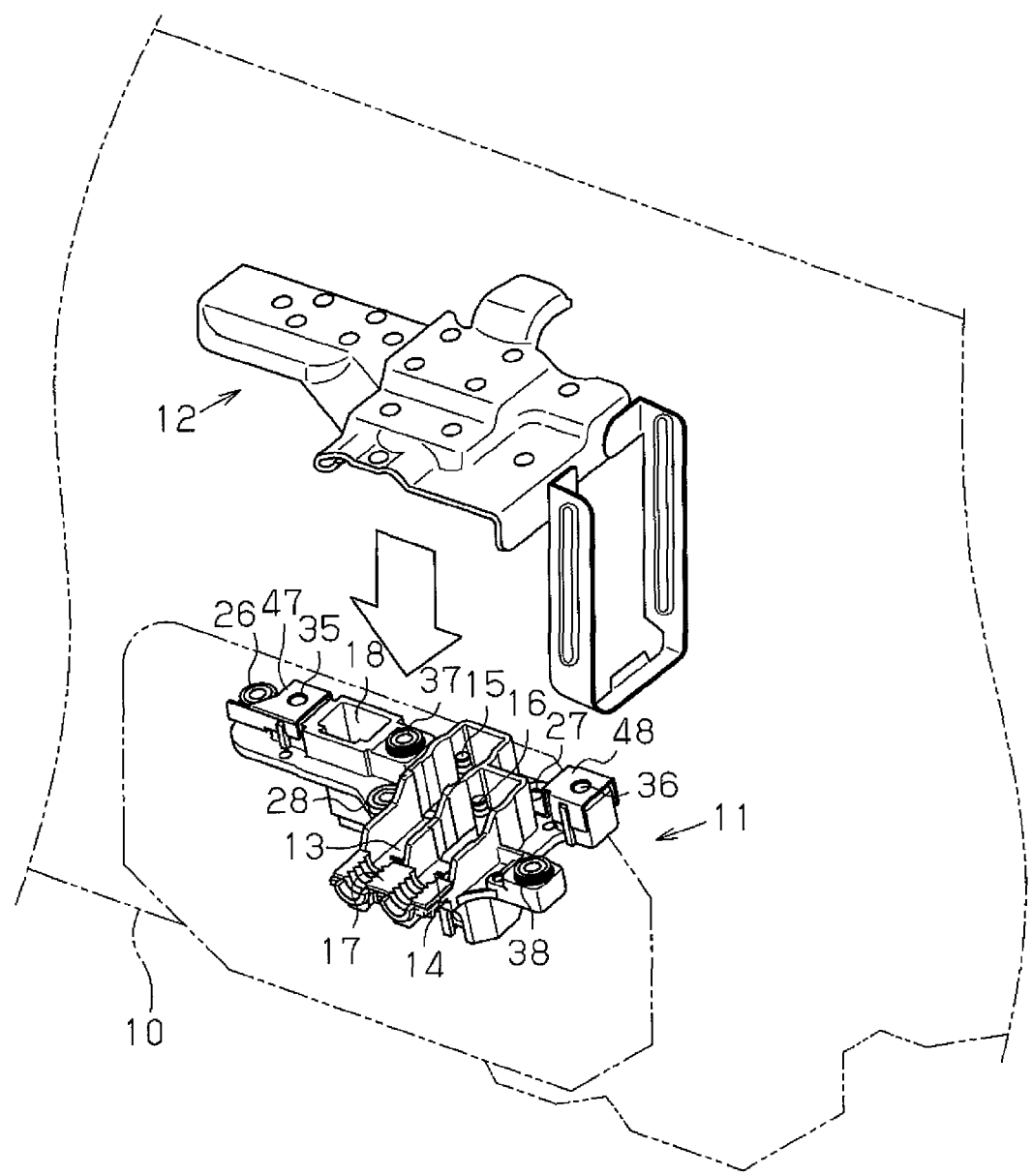
FIG. 5 is a perspective view showing the structure near a terminal base in a preferred embodiment of a battery pack according to the present invention in a state in which a terminal cover is separated from the terminal base.
Figure 6:
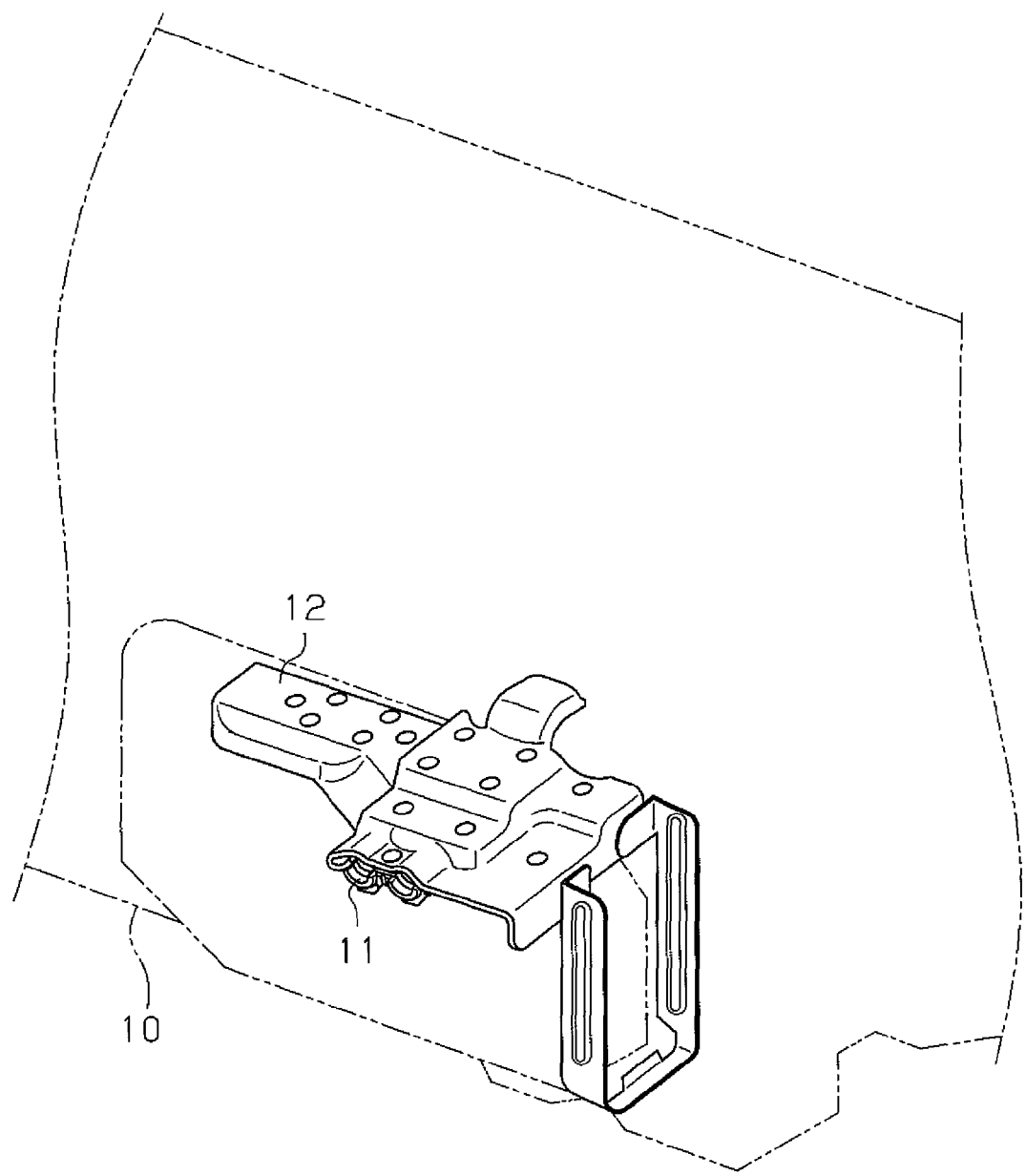
FIG. 6 is a perspective view showing the structure near the terminal base in the battery pack of FIG. 5 in a state in which the terminal cover is attached to the terminal base.

The battery pack has a main body of which the exterior portion is defined by a case formed from a conductive metal material. A battery is accommodated in the case. Referring to FIG. 5, a case 10 for the battery pack main body includes a side wall to which a terminal base 11 is secured. The terminal base 11 is a resin molded product and non-conductive. High voltage cables extending from a high voltage unit of a vehicle are connected to the terminal base 11. Each cable has a distal end provided with a round terminal, which is connected to the terminal base 11. As shown in FIG. 6, a terminal cover 12 is attached to the terminal base 11 so as to cover its upper surface. The terminal cover 12 is formed from a conductive metal material. The case 10 of the battery pack main body is grounded when installed in a vehicle.

In the battery pack, the terminal cover 12 is attached to the terminal base 11 and does not come into direct contact with the case 10 of the battery pack main body. In the preferred embodiment, electrical connection is established between the terminal cover 12 and the case 10 to ground the terminal cover 12. This ensures that the terminal cover 12 shields terminal connection portions in an optimal manner.

Figure 7:
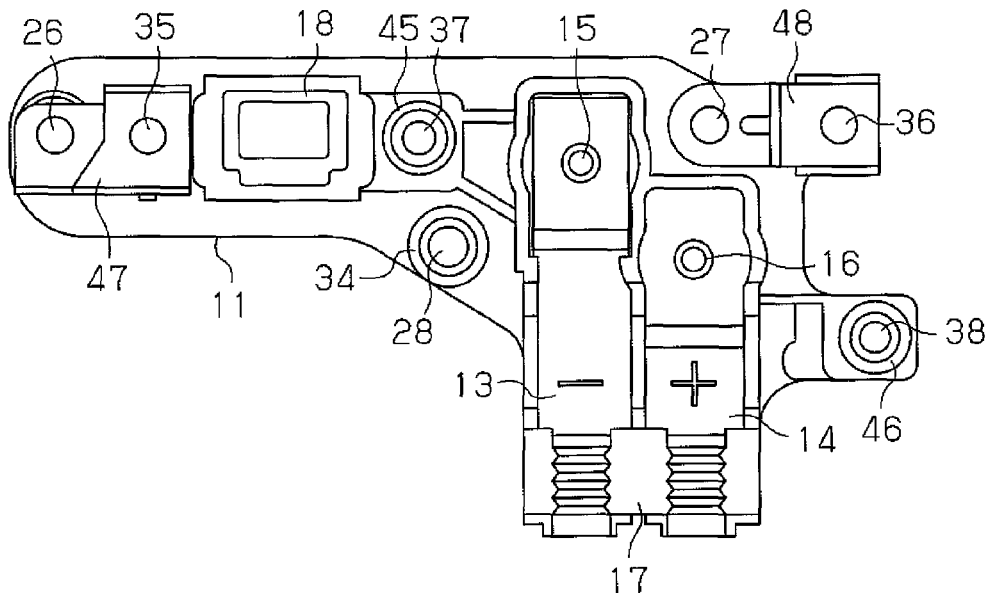
FIG. 7 is a plan view showing the structure of the terminal base in the battery pack of FIG. 5.
Figure 8:
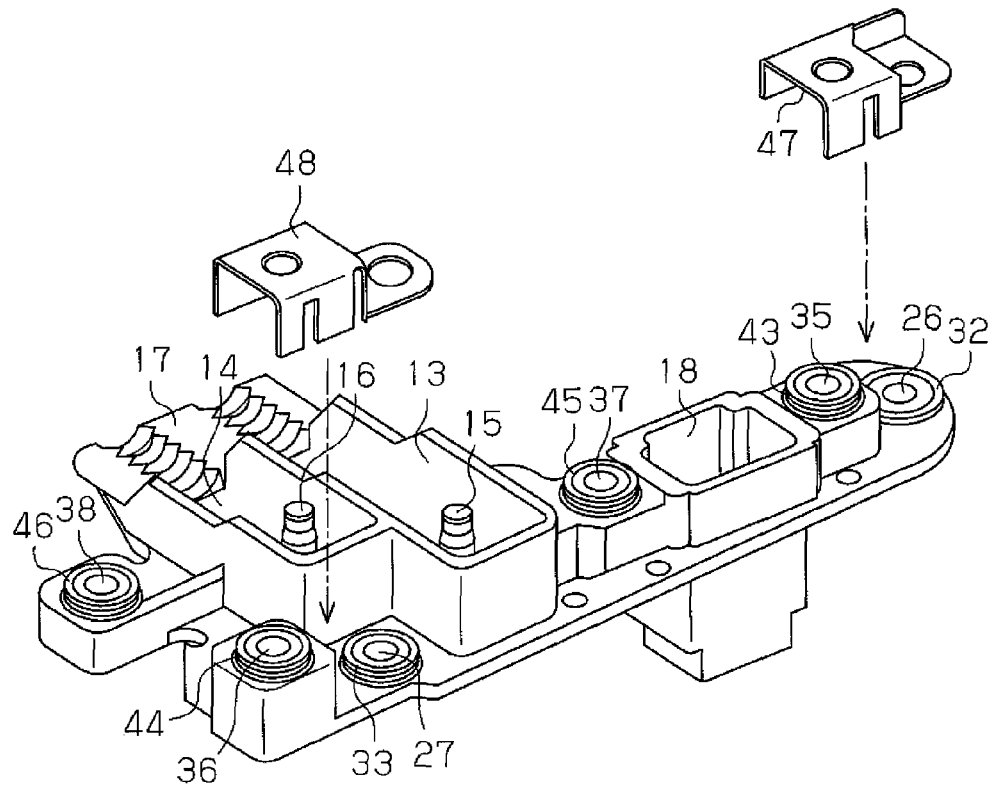
FIG. 8 is an exploded perspective view showing the structure of the terminal base in the battery pack of FIG. 5.

The terminal base 11 of the battery pack will now be described in detail. FIG. 7 is a plan view showing the structure of the terminal base 11, and FIG. 8 is an exploded perspective view showing the structure of the terminal base 11.

As shown in FIG. 7, the terminal base 11 includes two terminal connection portions 13 and 14, to which the round terminals on the distal ends of high voltage cables are connected. Stud bolts 15 and 16 for fastening the round terminals are respectively arranged on the terminal connection portions 13 and 14. A grommet 17, which is an elastic body of rubber or the like, is arranged at the distal ends of the two terminal connection portions 13 and 14 to hold the connected high voltage cables and protect the coating of the cables from damage.

An HVIL switch 18 is arranged on the terminal base 11. A plug 19 (refer to FIG. 9) projects from the rear surface of the terminal cover 12. The plug 19 is inserted into the HVIL switch 18 to close the HVIL switch 18 and electrically connect a battery, which is accommodated in the battery pack, to the terminal connection portions 13 and 14. The HVIL switch 18 opens when the plug 19 is removed therefrom and disconnects the battery from the terminal connection portions 13 and 14. That is, when the terminal cover 12 is removed from the terminal base 11, the HVIL switch 18 disconnects the terminal connection portions 13 and 14, which are arranged in the terminal base 11, from the battery, which is accommodated in the battery pack.

The terminal base 11 includes three terminal base fastening bolt attachments (hereafter, referred to as the "first attachments") 26 to 28. Each of the first attachments 26 to 28 receives a terminal base fastening bolt (hereafter, referred to as the "first bolt") for fastening the terminal base 11 to the case of the battery pack main body. Insert collars 32 to 34, which are formed by a metal conductive material, are respectively arranged in the first attachments 26 to 28. FIG. 7 shows only the insert collar 34, which is arranged in the first attachment 28. However, the insert collars 32 and 33 are also arranged in the other first attachments 26 and 27 in the same manner as shown in FIG. 8.

Furthermore, the terminal base 11 includes four terminal cover fastening bolt attachments (hereafter, referred to as the "second attachments") 35 to 38. Each of the second attachments 35 to 38 receives a terminal cover fastening bolt (hereafter, referred to as the "second bolt") for fastening the terminal cover 12 to the terminal base 11. Metal insert nuts 43 to 46 are respectively arranged in the second attachments 35 to 38. FIG. 7 shows only two insert nuts 45 and 46 arranged in the second attachments 37 and 38. However, the insert nuts 43 and 44 are also arranged in the other second attachments 35 and 36 in the same manner as shown in FIG. 8.

In the battery pack, bus bars 47 and 48 for grounding the terminal cover 12 are arranged at two locations on the terminal base 11. The bus bars 47 and 48 are formed from a metal conductive material. As shown in FIG. 8, the bus bar 47 is set to connect the first attachment 26 to the second attachment 35, which are arranged next to each other. In the same manner, the other bus bar 48 is set to connect the first attachment 27 and the second attachment 36, which are arranged next to each other.

Figure 9:
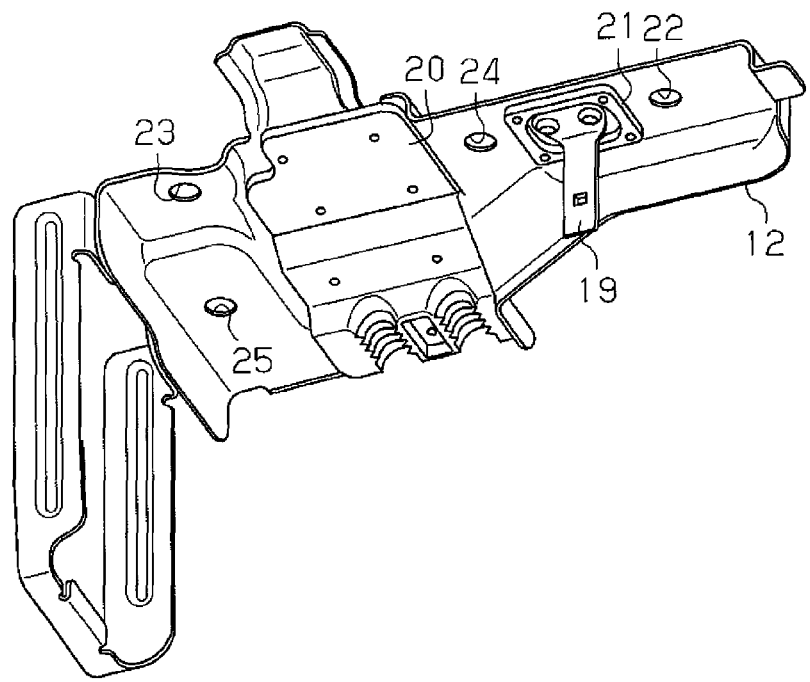
FIG. 9 is a perspective view showing the terminal cover in the battery pack of FIG. 5 from the rear side.

The terminal cover 12 attached to the terminal base 11 in this manner will now be described in detail. FIG. 9 is a perspective view showing the structure of the terminal cover 12 from the rear side.

As shown in FIG. 9, the plug 19, which opens and closes the HVIL switch 18 in accordance with the attachment and removal of the terminal cover 12, is arranged on the rear surface of the terminal cover 12. Further, seals 20 and 21, which are formed by elastic bodies of rubber or the like, are attached to the rear surface of the terminal cover 12 at portions that come into contact with the terminal connection portions 13 and 14 of the terminal base 11 and the HVIL switch 18. The seals 20 and 21 protect the terminal connection portions 13 and 14 and the EVIL switch 18 from moisture. The seal 20, which comes into contact with the terminal connection portions 13 and 14, also functions to hold and protect the high voltage cables with the grommet 17 of the terminal base 11. The terminal cover 12 also includes four bolt insertion holes 22 to 25, each receiving a bolt (i.e., the second bolt) for fastening the terminal cover 12 to the terminal base 11.

In the battery pack, when attaching the terminal cover 12 to the terminal base 11, the bus bars 47 and 48 electrically connect the case 10 of the battery pack main body to the terminal cover 12 and thereby ground the terminal cover 12. Such electrical connection of the case 10 and the terminal cover 12 with the bus bars 47 and 48 will now be specifically described.

Figure 10:
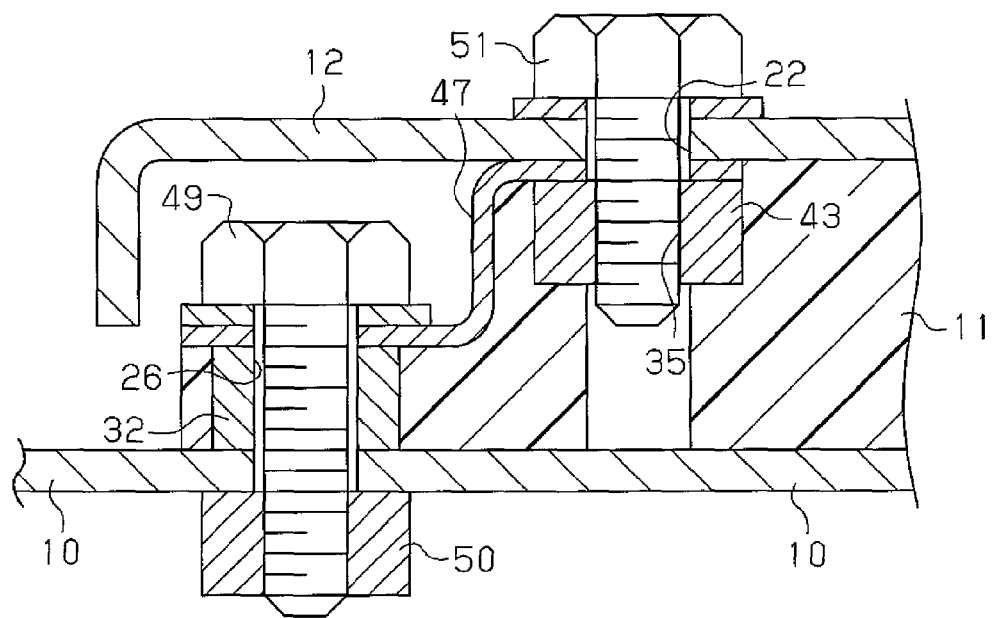
FIG. 10 is a schematic cross-sectional view showing a grounding structure for the terminal cover in the battery pack of FIG. 5.

FIG. 10 is a schematic cross-sectional view showing the structure near the portion where the bus bar 47 is set. As shown in FIG. 10, a first bolt 49 is inserted into the first attachment 26 on the terminal base 11 and fastened to a nut 50, which is fixed to the rear surface of the case 10 for the battery pack main body. A second bolt 51 is inserted through the bolt insertion hole 22 in the terminal cover 12 and fastened to the insert nut 43 arranged in the second attachment 35 on the terminal base 11.

The bus bar 47 has one end held between the upper surface of the first attachment 26 and the bolt head of the first bolt 49. The bus bar 47 has another end held between the upper surface of the second attachment 35 and the terminal cover 12. Thus, the bus bar 47 is in contact with the upper surface of the insert collar 32, which is arranged in the first attachment 26, and the rear surface of the terminal cover 12. Further, the lower surface of the insert collar 32 is in contact with the surface of the case 10 for the battery pack main body. The insert collar 32 and the bus bar 47 are both formed from a conductive material. Thus, the insert collar 32 and the bus bar 47 electrically connect the case 10 for the battery pack main body and the terminal cover 12. Since the case 10 for the battery pack main body is grounded, the case 10 grounds the terminal cover 12.

The bus bar 48, which connects the first attachment 27 and the second attachment 36, is set in the same manner as the bus bar 47. Thus, the insert collar 33, which is arranged in the first attachment 27, and the bus bar 48 also electrically connect the case 10 for the battery pack main body and the terminal cover 12. In other words, in the preferred embodiment, the battery pack has two separate electrical conduction routes connecting the case 10 and the terminal cover 12.

In the preferred embodiment, the insert collars 32 and 33 and the bus bars 47 and 48 are in contact with both of the terminal cover 12 and the case 10 and correspond to a conductor formed by a conductive material.

In the preferred embodiment, the battery pack has the advantages described below.

(1) The battery pack includes the two bus bars 47 and 48, which respectively connect the first attachments 26 and 27 to the second attachments 35 and 36 on the terminal base 11. Further, the insert collars 32 and 33, which are arranged in the first attachments 26 and 27, and the bus bars 47 and 48 electrically connect the case 10 of the battery pack main body and the terminal cover 12. Thus, the terminal cover 12 is grounded with a relatively simple modification. Accordingly, the terminal cover 12 shields the terminal connection portions 13 and 14 in an optimal manner.

(2) The insert collars 32 and 33 arranged in the first attachments 26 and 27 electrically connect the bus bars 47 and 48 to the case 10. Thus, with a relatively simply structure, the bus bars 47 and 48 electrically connect the case 10 and the terminal cover 12.

(3) The case 10 and the terminal cover 12 are electrically connected through two routes formed by the bus bars 47 and 48. Thus, even if electrical conduction cannot be established in one of the routes due to a contact failure or the like, the terminal cover 12 can still be grounded through the other route. Accordingly, the terminal connection portions 13 and 14 remain shielded in an optimal manner and improve product reliability.

(4) The grounding of the terminal cover 12 is ensured without directly attaching the terminal cover 12 to the case 10 for the battery pack main body. Thus, with the structure for attaching the terminal cover 12 to the terminal base 11, the terminal cover 12 shields the terminal connection portions 13 and 14 while ensuring the operability of the HVIL switch 18 and the sealing of the terminal connection portions 13 and 14 and the HVIL switch 18 with the seals 20 and 21.

(5) While employing round terminals, which have no shield functions, as the terminals for connecting high voltage cables to the terminal connection portions 13 and 14, the terminal cover 12 prevents the leakage of electromagnetic noise from the terminal connection portions 13 and 14.

The preferred embodiment of the battery pack described above may be modified as described below.

The shapes of the bus bars 47 and 48 may be varied as required in accordance with the positional relationship of the connected first and second attachments. As long as the bus bar is formed from a conductive material and connects the first and second attachments, regardless of shape, electrical conduction between the first and second attachments and, ultimately, electrical conduction of the case 10 for the battery pack main body and the terminal cover 12 can be established. To keep the bus bars 47 and 48 simply shaped and compact, it is preferable that the connected first and second attachments be located as close as possible to each other.

The electrical conduction of the bus bars 47 and 48 with the case 10 may be established by components other then the insert collars 32 and 33 arranged in the first attachments 26 and 27. For example, the first bolt 49 and the nut 50 may be formed by conductive materials. In this case, the electrical conduction between the bus bar 47 and the case 10 can be established by the first bolt 49 and the nut 50. In such a structure, the bus bar 47, the first bolt 49, and the nut 50 serve as the conductor.

The conductor may be formed by only the bus bars 47 and 48. That is, in addition to electrically connecting the first and second attachments, the bus bars 47 and 48 may be electrically connected to the case 10.

In the preferred embodiment, the two bus bars 47 and 48 on the terminal base 11 form two electrical conduction routes between the terminal cover 12 and the case 10. However, the possibility of the two electrical conduction routes both being broken due to contact failures is low. Thus, only one electrical conduction route can be formed by using only one bus bar. In this case, the conductor is formed by, for example, the insert collar 32 and the bus bar 47. If necessary, three or more bus bars may be used to form three or more electrical conduction routes.

When necessary, the seals 20 and 21 arranged on the terminal cover 12 and/or the HVIL switch 18 arranged on the terminal base 11 can be eliminated. In such a case, the terminal cover 12 that is attached to the terminal base 11 and not in direct contact with the case 10 for the battery pack main body can still be electrically connected to the case 10 by the bus bars. Accordingly, terminal cover 12 shields the terminal connection portions 13 and 14 in an optimal manner.

In the preferred embodiment, the terminal cover 12, which is attached to the terminal base 11 but does not come in direct contact with the case 10 for the battery pack main body, is electrically connected to the case 10 by the bus bars 47 and 48, which connect the first attachments 26 and 27 and the second attachments 35 and 36 on the terminal base 11. Alternatively, a conductor formed from a conductive material and contacting both of the terminal cover 12 and the case 10 may be used in lieu of the bus bars 47 and 48. This would also establish electrical conduction between the case 10 for the battery pack main body and the terminal cover 12.

Figure 11:
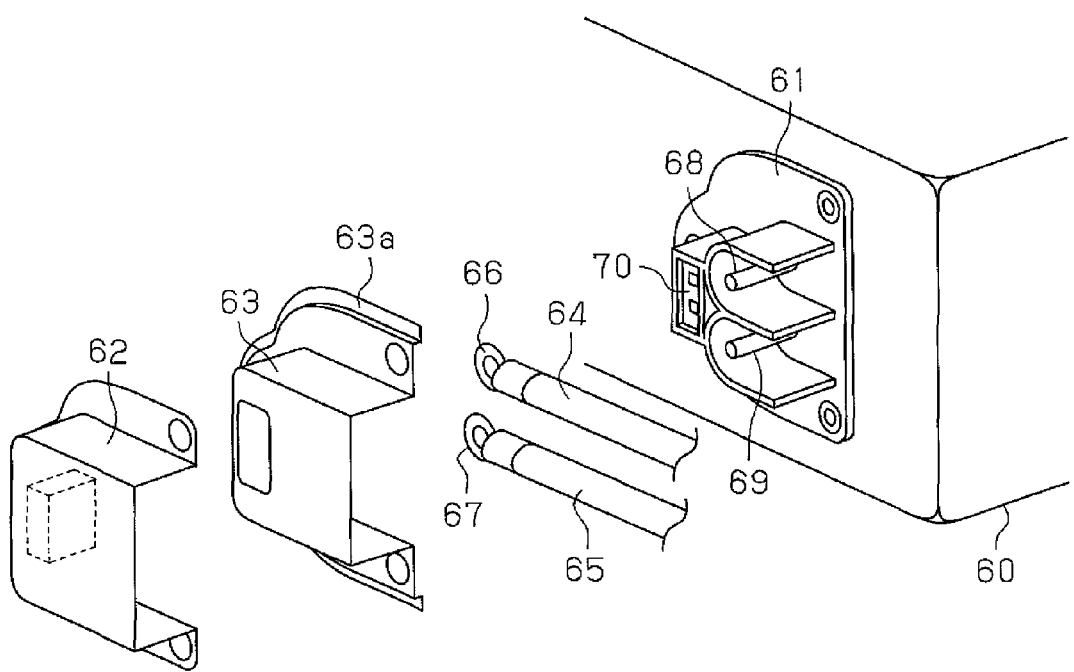
FIG. 11 is a perspective view showing the structure near a terminal base in a further embodiment of a battery pack according to the present invention.

For example, in a further embodiment of a battery pack according to the present invention, as shown in FIG. 11, a terminal base 61 is attached to the outer side of a case 60 for a battery pack main body. A terminal cover 62 is attached to the terminal base 61. A grounding plate 63 serving as a conductor is arranged between the terminal base 61 and the terminal cover 62. The grounding plate 63 includes a rim 63a, which comes in contact with the case 60. More specifically, the grounding plate 63, which is formed by a conductive material, is attached to the terminal base 61 so as to cover the upper surface thereof. The terminal cover 62 is then attached to the grounding plate 63. The terminal base 61 include terminal connection portions 68 and 69 and an HVIL switch 70. Round terminal 66 and 67, which are arranged on the distal ends of high voltage cables 64 and 65, are connected to the terminal connection portions 68 and 69.

Figure 12:
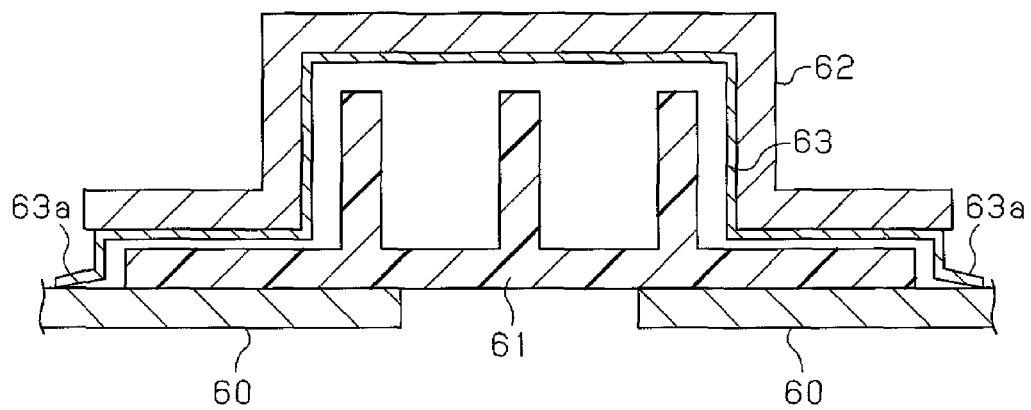
FIG. 12 is a cross-sectional view showing the structure near the terminal base in the battery pack of FIG. 11.

The grounding plate 63 arranged between the terminal base 61 and the terminal cover 62 is thinner than the terminal cover 62 and can be resiliently deformed in a relatively simple manner. As shown in FIG. 12, the grounding plate 63 is arranged on the case 60 in a state in which the rim 63a contacting the case 60 is flexed. Thus, the resiliency of the grounding plate 63 constantly urges the rim 63a toward the case 60. This keeps the case 60 and the grounding plate 63 in constant contact.

Accordingly, the grounding plate 63, which comes in contact with both of the case 60 and the terminal cover 62, electrically connects the case 60 and the terminal cover 62. In this state, the case 60 for the battery pack main body is grounded. This grounds the terminal cover 62 and optimally shields the terminal connection portions 68 and 69 with the terminal cover 62.

It should be apparent to those skilled in the art that the present invention may be embodied in many other specific forms without departing from the spirit or scope of the invention. Particularly, it should be understood that the present invention may be embodied in the following forms.

The present invention may be applied to a battery pack that does not include an HVIL switch on the terminal base.

The present invention may be applied to a battery pack used for applications other than vehicle power sources. More specifically, the present invention is applicable to any battery pack including a case formed from a conductive material and accommodating a battery, a terminal base formed from a non-conductive material and attached to the outer side of the case, and a terminal cover formed from a conductive material and attached to the terminal base.

The present examples and embodiments are to be considered as illustrative and not restrictive, and the invention is not to be limited to the details given herein, but may be modified within the scope and equivalence of the appended claims.

What is claimed is:

1. A battery pack for accommodating a battery, the battery pack comprising:
   a case, which is formed from a conductive material and grounded, for accommodating the battery;
   a terminal base which is formed from a non-conductive material and attached to the case;
   a terminal cover which is formed from a conductive material and attached to the terminal base without contacting the case, with the terminal base including a first attachment which is receivable of a first bolt for fastening the terminal base to the case, and a second attachment which is receivable of a second bolt for fastening the terminal cover to the terminal base; and
   a first bus bar which is formed from a conductive material and electrically connects the terminal cover to the case and ground the terminal cover,
   wherein the first bus bar includes a first end, which is held between the first attachment and a bolt head of the first bolt so that the first bus bar is electrically connected to the case, and a second end, which is held between the second attachment and the terminal cover so that the first bus bar is electrically connected to the terminal cover.

2. The battery pack according to claim 1, further comprising: a collar which is formed from a conductive material and is arranged in the first attachment to connect the first bus bar and the case.

3. The battery pack according to claim 1, further comprising: a second bus bar which is formed from a conductive material and which is arranged on the terminal base to connect the terminal cover and the case.

4. The battery pack according to claim 1, wherein the terminal base includes a terminal connection portion which is electrically connectable to the battery in the case, the battery pack further comprising: a switch which is arranged on the terminal base and electrically disconnects terminal connection portion and the battery in the case when the terminal cover is removed from the terminal base.

5. The battery pack according to claim 1, further comprising: a seal which seals the terminal base from the terminal cover.

6. The battery pack according to claim 1, wherein the terminal base is connectable to a round terminal.

* * * * *